United States Patent
Adelsperger et al.

[19]

[11] Patent Number: 5,899,189
[45] Date of Patent: May 4, 1999

[54] METHOD TO ADJUST THE HORSEPOWER OUTPUT OF AN INTERNAL COMBUSTION ENGINE TO A TARGET HORSEPOWER OUTPUT RANGE

[75] Inventors: James W. Adelsperger, Northville; William R. Tritten, Carleton; Jeffrey A. Lies, Saline, all of Mich.

[73] Assignee: Detroit Diesel Corporation, Detroit, Mich.

[21] Appl. No.: 08/959,812

[22] Filed: Oct. 29, 1997

[51] Int. Cl.$^6$ .............................. F02B 75/06; G01M 15/00
[52] U.S. Cl. ...................... 123/436; 73/117.3; 123/480; 701/104
[58] Field of Search ..................................... 123/436, 478, 123/480; 73/116, 117.3; 701/101, 102, 103, 104

[56] References Cited

U.S. PATENT DOCUMENTS

| | | | |
|---|---|---|---|
| 4,383,441 | 5/1983 | Willis et al. | 73/117.3 |
| 4,438,497 | 3/1984 | Willis et al. | 73/117.3 X |
| 5,426,585 | 6/1995 | Stepper et al. | 701/101 X |
| 5,477,827 | 12/1995 | Weisman, II et al. | 123/436 |

Primary Examiner—Tony M. Argenbright
Attorney, Agent, or Firm—Bill C. Panagos

[57] ABSTRACT

A method and system for adjusting the horsepower output of an internal combustion engine having an electronic control with programmable memory, at least one cylinder, and at least one fuel injector in fuel delivery communication with said cylinder. The method includes operating the engine at full load until the engine reaches an equilibrium operating temperature and achieves an overall engine operating horsepower, sensing the overall engine operating horsepower and comparing the overall engine operating horsepower to a target engine operating horsepower.

Fuel dispensed by the fuel injectors to each cylinder individually sequentially is cut off and the change in overall engine horsepower output per each disabled cylinder is recorded.

The fuel injector delivery output is adjusted based upon the percent deviation of overall engine horsepower output per cylinder and the overall engine horsepower percent deviation.

22 Claims, 3 Drawing Sheets

METHOD TO ADJUST THE HORSEPOWER OUTPUT OF AN INTERNAL COMBUSTION ENGINE TO A TARGET HORSEPOWER OUTPUT RANGE

BACKGROUND OF THE INVENTION

1. Field of the Invention

The present invention relates to a method and a system to adjust the horsepower output of an internal combustion engine having an electronic control with programmable memory to within a target range such that it is possible to manufacture engines of the same make and model having greater uniformity of engine horsepower when comparing engines within a given series.

The present invention further relates to a method and a system for adjusting the horsepower output of an internal combustion engine having an electronic control with programmable memory, at least one cylinder, and at least one fuel injector in fuel delivery communication with said cylinder by measuring the horsepower developed by the engine during normal operation, and adjusting the fuel dispensed by the fuel injectors as needed in order to adjust the horsepower developed by an engine to a target or nominal range.

The present invention further relates to a method and a system for controlling the horsepower output of a compression ignition internal combustion engine, such as a diesel engine, so that the engines of a given series conform more uniformly to a target horsepower output range.

2. Description of the Related Art

Electronic controllers for internal combustion engines are old and well known in the art. In diesel engines, the conventional practice utilizes electronic control units having volatile and nonvolatile memory, input and output driver circuitry, and a processor capable of executing a stored instruction set, to control the various functions of the engine and its associated systems. A particular electronic control unit communicates with numerous sensors, actuators and other electronic control units necessary to control various functions which may include aspects of fuel delivery.

During engine manufacturing, or during engine service life, a certain range of engine horsepower output which differs from the target or nominal horsepower rating has been tolerated because there has been no easy way to ensure that an engine rated at a certain horsepower accurately developed that rated or nominal horsepower. If the horsepower developed by an engine is too high for a given nominal rating, the engine suffers premature wear with resulting lessening of engine life. Moreover, operators of vehicles equipped with such engines experienced uncertainty in duty cycles and hauling capabilities because the horsepower rating varied over such a wide range for a given manufacturer's model series. Thus, uniformity of engine models within a fleet of vehicles with such engines was still no guarantee that each engine developed the same horsepower, or was capable of hauling the same loads and acting the same way over the same route. This unpredictable effect is costly to the fleet owner in terms of fuel consumption and engine service life.

Weisman et al., U.S. Pat. No. 5,477,827 discloses a method for comprehensive control of an internal combustion engine, such as a compression ignition engine, utilizing an electronic control module. The control strategy integrates various functions of engine control including an acceleration balance test for the engine cylinders, a fuel economy vehicle speed limit adder, a fueling limit for high altitude vehicle operation, throttle logic, a data-hub for operation trending and vehicle component lifting analyses, a gear ratio torque limit, an air temperature based torque limit, enhanced fan control, and an idle shutdown strategy based on ambient temperature. Included within the '827 patent is a method for balancing the fuel injectors. The method comprises operating the engine at a predetermined idle speed so as to permit the engine to stabilize, and cutting off the fuel delivered by the fuel injectors to at least one of the cylinders. The method further comprises measuring the acceleration RPM of the engine with at least one cylinder cut out, and modifying the fuel delivered from the fuel injectors based on the measured acceleration RPM so as to balance the power output of each cylinder. The balancing of the cylinders is done so as to reduce particulate emissions, improve fuel economy and reduce localized engine wear. There is no showing that it is possible to adjust the horsepower output of the engine to a target range which is uniform within a nominal target range.

SUMMARY OF THE INVENTION

It is therefore an object of this invention to provide for a method and a system to adjust the horsepower output of an internal combustion engine to within a target range to produce greater uniformity over a given engine series.

In addition, it is a further object of this invention to provide for a method and a system for adjusting the horsepower output of an internal combustion engine having an electronic control with programmable memory, at least one cylinder, and at least one fuel injector in fuel delivery communication with the cylinder, comprising the steps of operating the engine at full load until the engine reaches equilibrium operating temperature and achieves a steady overall operating horsepower; sensing the overall engine operating horsepower and comparing the overall engine horsepower via an engine dynamometer, to a target engine operating horsepower, cutting off fuel delivery to each cylinder individually sequentially, and recording the change in overall engine horsepower output per each disabled cylinder and adjusting the fuel injector delivery output based upon the percent deviation of overall horsepower output per cylinder and the overall engine horsepower percent deviation.

These and other objects and advantages will become apparent to one of ordinary skill in the art upon a reading of the detailed description of a preferred embodiment when taken in connection with the accompanying drawings and descriptions thereof.

DETAILED DESCRIPTION OF THE PREFERRED EMBODIMENT

Figure 1:
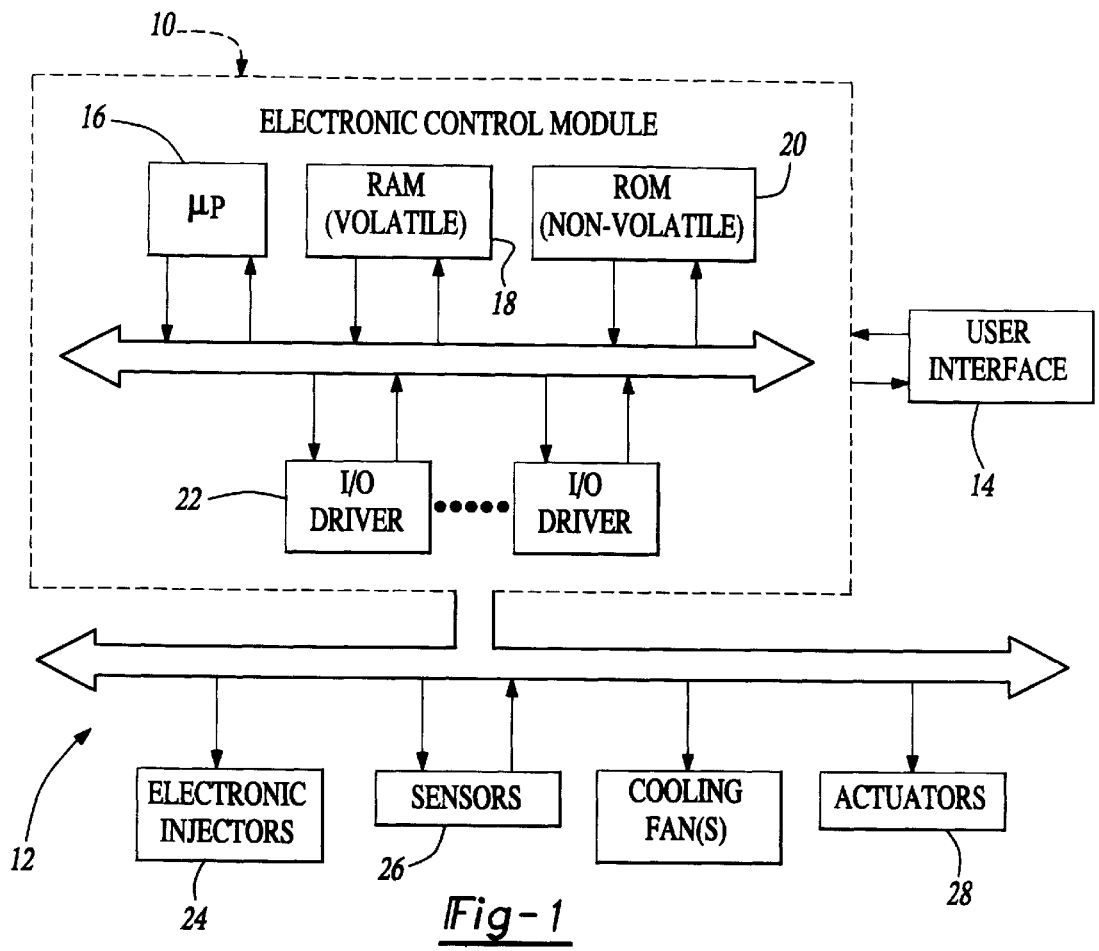
FIG. 1 is a block diagram of an integrated control system for a compression ignition internal combustion engine in accordance with the present invention.

Referring now to the drawings, wherein like numeral refer to like structures, and particularly to FIG. 1, there is shown an electronic control module (ECM) 10 in communication with a typical engine componentry, shown generally by reference numeral 12, and a user interface 14. As shown, the ECM includes a microprocessor 16 having volatile random-access memory (RAM) 18, and nonvolatile read-only memory (ROM) 20. It is understood by those skilled in the art that the ECM may contain other types of memory instead of, or in addition to, RAM 18 and ROM 20, such as flash EPROM or EEPROM memories, as is well known in the art.

The ROM 20, or other nonvolatile memory, may contain instructions which are executed to perform various control and information functions as well as data tables, which contain calibration values and parameters characterizing normal engine operation. Microprocessor 16 imparts control signals to, and receives signals from, input and output (I/O) drivers 22. The (10) drivers are in communication with the engine componentry 12 and serve to protect the controller from hostile electrical impulses while providing the signals and power necessary for engine control according to the present invention. The ECM componentry detailed above is interconnected by data, address and control busses. It should be noted that there are a variety of other possible control schemes which include various combinations of microprocessors and electric or electronic circuits which could perform the same function.

The engine componentry 12 includes at least one, and preferably a plurality of electronic unit injectors (EUI) 24, each associated with a particular engine cylinder; and a plurality of sensors 26 for indicating various engine operating conditions, including fuel temperature, fuel pressure, cylinder sequencing, and cylinder position to name a few. The engine componentry also includes actuators 28 which may include solenoids, variable valves, indicator lights, motors, and/or generators. It should further be appreciated that the ECM may also be in communication with other vehicle componentry, such as is well known in the art.

The user interface 14 is used to store user selected parameters to monitor and values for those parameters, and determine service intervals and perform trend analyses. User selected parameters include engine operation data such as fuel delivery parameters, among others.

The electronic control module 10 executes software so as to implement the various features of the present invention. In describing these features, equations will be provided and reference will be made or variables utilized by the Test Cell Computer (TCC) in executing the software. The TCC is a modified Digitlog Cell Mate, made by Digitlog. It should be noted that variables shown in lower case italics are calibration variables, whereas variables shown in SMALL CAPS represent function variables, whose value varies and is based on, for example, operating conditions such as horsepower output.

Figure 2:
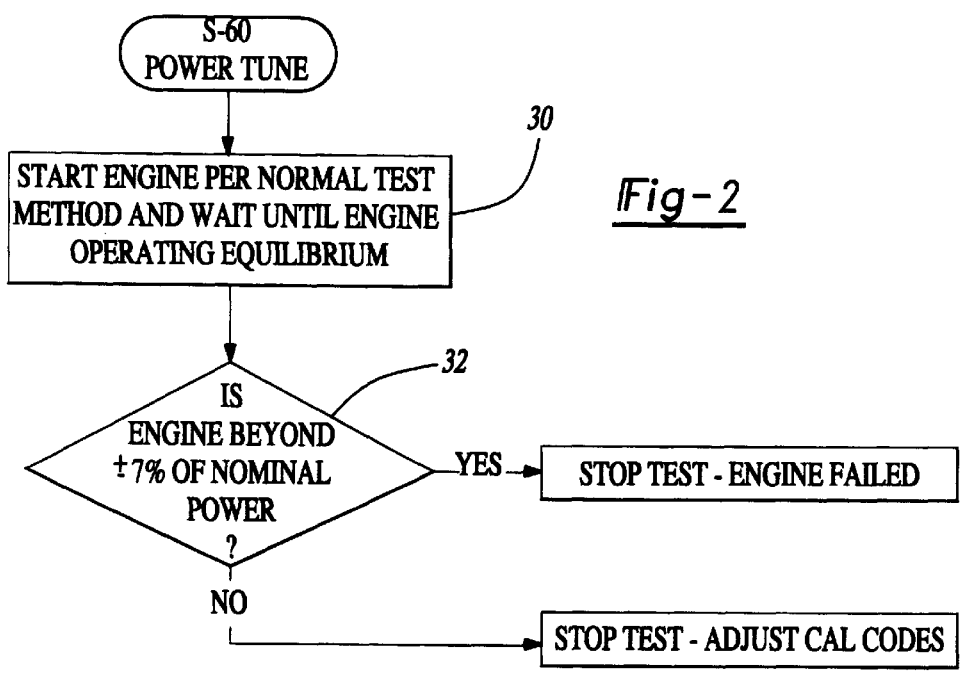
FIG. 2 is a flow chart detailing the steps the used in the method of the present invention to determine whether an engine is operating within an acceptable target engine horsepower output.

Turning now to FIG. 2, there is shown a flow chart detailing the steps the TCC takes to determine whether the engine is operating within an acceptable target horsepower output. At block 30, the engine is started and allowed to run until the engine reaches an operation equilibrium and achieves the overall engine horsepower. It will be understood that the ECM attempts to balance the injectors at lower speeds so that power delivery is approximately equal by performing an acceleration test to determine the relative power from each injector. At step 32, the ICC determines whether the engine is operating beyond some predetermined range of nominal power. If the engine is determined to be operating beyond this predetermined range of nominal horsepower, or target horsepower, the engine is determined to be defective and the testing is stopped. However, if it is determined that the engine is operating between about $-7\%$ and $+7\%$ of nominal or target horsepower output, the fuel delivery output of the fuel injectors is adjusted to each cylinder as needed in order to bring the horsepower generated by the engine to within the target engine horsepower range. This process will be discussed more specifically in reference to FIG. 3.

Figure 3:
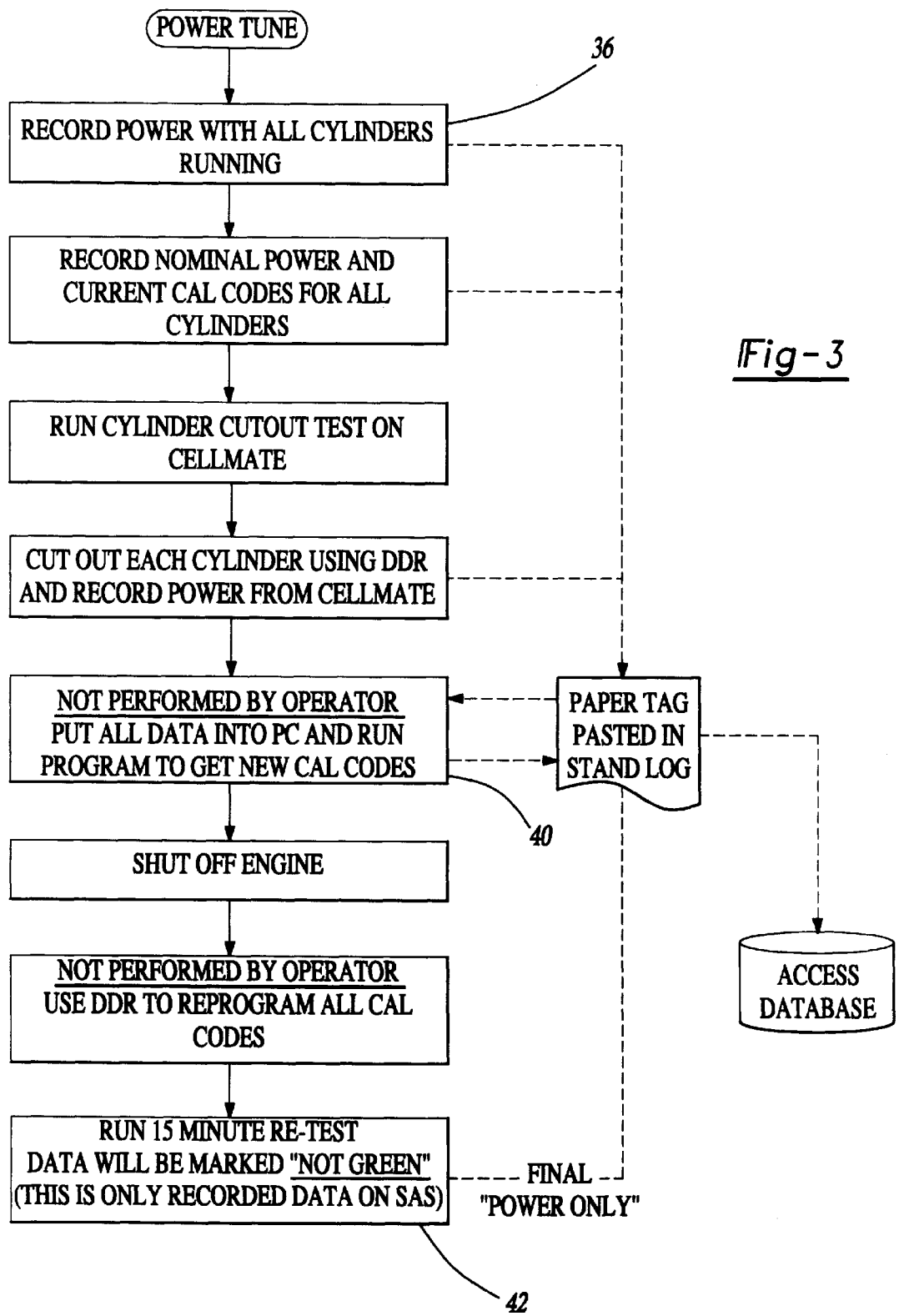
FIG. 3 is a flow chart detailing the steps used in the method of the present invention to adjust the overall engine horsepower output to a target engine horsepower output.

Turning now to FIG. 3, there is shown the steps for adjusting the fuel delivery output of the fuel injectors to the engine when it is determined that the engine is operating in the range of about $-7\%$ to about $+7\%$ of the nominal or target horsepower output.

Specifically, at step 36, the TCC records the horsepower output of the engine as it is actually being generated from the running engine. The nominal power and current calibration codes for the fuel delivery to each of the cylinders is accessed from the ECM. Each cylinder is cut out from the fueling scheme individually sequentially and the horsepower output is recorded. This is repeated for each cylinder, as it is cut out from the fueling scheme individually and sequentially, such that at any one period of time, only one cylinder is cut out from the fueling scheme. It is appreciated by those skilled in the art that the fuel flow injection scheme could be interrupted by a variety of software commands, and it is understood that the scheme set forth in U.S. Pat. No. 5,477,827 is expressly incorporated in its entirety for purposes of this explanation.

With continuing reference to FIG. 3, at step 40, the calibrations for adjusting the fuel flow scheme by controlling the fuel delivery output from the fuel injectors is determined by determining the percent horsepower deviation per engine cylinder and the overall engine horsepower percent deviation according to the formula:

$$CCF = \frac{\left(\frac{6}{5}\overline{HP}_{cutout} - HP_{cx} - HP_{Target}\right)}{HP_{Target}} \cdot 100$$

and then entering the new fuel injector delivery output calibrations into the ECM memory. It can be further appreciated that although it is not mandatory, the engine should be shut down in order to change of fuel injector delivery output calibrations. The engine may then be retested to determine, as at step 42, to confirm that the final horsepower output of the engine is within the target engine horsepower output.

Figure 4:
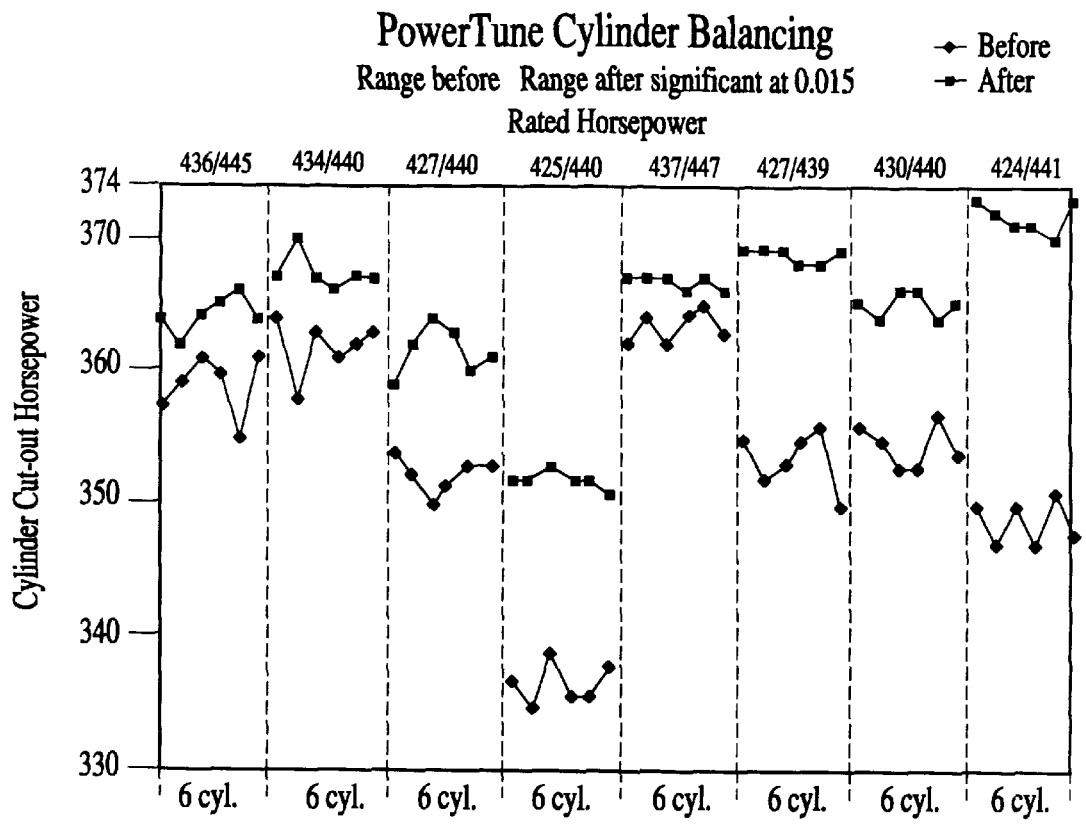
FIG. 4 is chart showing the cylinder cutout horsepower (5 of 6 cylinders firing) output before and after the method of the present invention.

Turning to FIG. 4, is graph of the horsepower output of a series of eight engines both before and after being adjusted according to the method of the present invention. Specifically, each engine tested was a SERIES 60® Engine, which is a six cylinder, four cycle compression ignition engine available from DETROIT DIESEL CORPORATION, assignee of this invention. The target, or nominal horsepower rating for each engine in this particular series was 439 bhp. The x axis of the graph depicts the number of cylinders for each engine tested, and the y axis of the graph depicts the horsepower (generated by the engine with one cylinder cut off from the fuel delivery scheme. As can be seen by a review of the graph, the mean cylinder cutout horsepower range developed by the engine with one cylinder cut off from the fuel delivery scheme before the method of the present invention is 4.6 bhp, whereas the mean cylinder cutout horsepower range developed by the engine with one cylinder cut off from the fuel delivery scheme after the method of the present invention is 2.8 bhp. Moreover, it can be seen that the overall engine horsepower of engine before adjustment according to the method of the present invention was 430 bhp, whereas after the method of the present invention, it was 442 bhp. Each of the engines had similar improvements in reaching the target horsepower of 439 bhp, as set forth in the following table:

| ENGINE NO. | BHP BEFORE | BHP AFTER |
|---|---|---|
| 1 | 436 | 445 |
| 2 | 434 | 440 |
| 3 | 427 | 440 |
| 4 | 425 | 440 |
| 5 | 437 | 447 |
| 6 | 427 | 439 |
| 7 | 430 | 440 |
| 8 | 424 | 441 |

By a review of the data collected, as set forth in the above table and FIG. 4, it can be seen that there is a greater uniformity of horsepower output per engine over a given series after the method of the present invention than before the method of the present invention. Moreover, since the target horsepower is 439 bhp for this series of engines, the range of difference between the target horsepower and the overall horsepower after the method of the present invention is much narrower than the range of the difference between the target horsepower and the overall horsepower before the method of the present invention.

Figure 5:
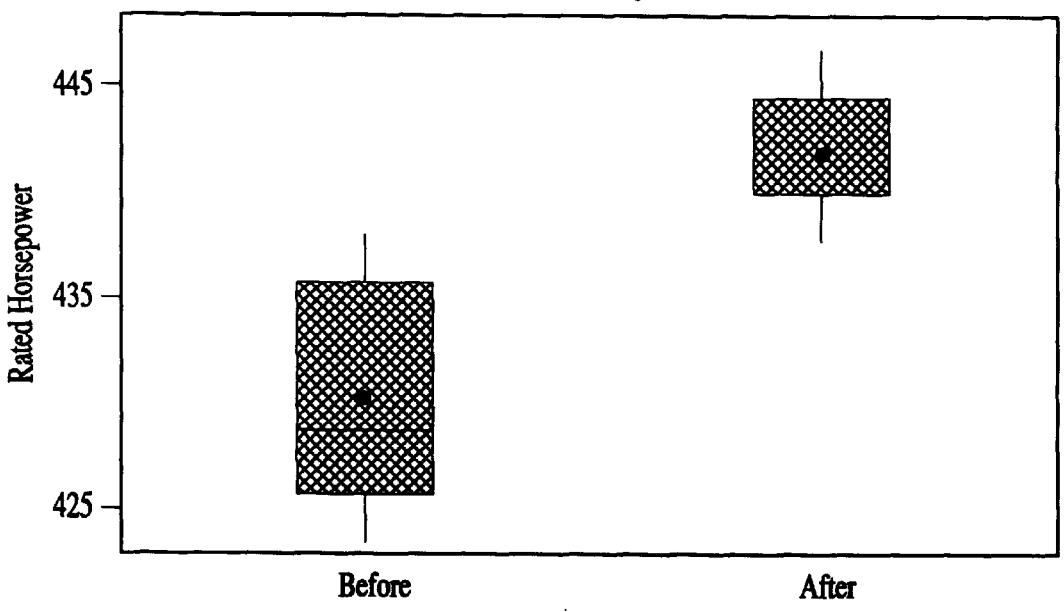
FIG. 5 is a boxplot of overall engine horsepower (6 of 6 cylinders firing) output before and after the method of the present invention.

Turning to FIG. 5, there is shown a boxplot graph of engine horsepower before and after being subjected to the method of the present invention. The y axis represents the horsepower of the engine and a review of the figure shows the range of overall engine horsepower before the method of the present invention was from about 424 bhp to about 437 bhp, whereas after being adjusted according to the method of the present invention, the range of overall engine horsepower was from about 439 bhp to about 447 bhp. Thus, it can be readily seen that before being adjusted according to the present invention, the horsepower range was 13 bhp, for a given series of engine with same nominal or target horsepower rating, whereas after being adjusted according to the present invention, the same series of engines had a horsepower variation range of about 8 bhp.

Those skilled in the art will recognize that while the forms of the invention shown herein as described constitute the preferred embodiment of the invention, it is not intended to illustrate all possible forms thereof. It should also be appreciated that the words used are descriptive rather than limiting, and that various changes and modifications may be made without departing from the scope and spirit of the disclosed invention.

We claim:

1. A method for adjusting the horsepower output of an internal combustion engine having an electronic control module (ECM) with programmable memory, at least one cylinder, and at least one fuel injector in fuel delivery communication with said cylinder, said method comprising the steps of:

(a) operating the engine at full load until the engine reaches an equilibrium operating temperature and achieves an overall engine operating horsepower;

(b) sensing the overall engine operating horsepower;

(c) comparing the overall engine operating horsepower to a target engine operating horsepower;

(d) cutting off fuel dispensed by the fuel injectors to each cylinder individually sequentially, and recording the change in overall engine horsepower output per each disabled cylinder; and (e) adjusting the fuel injector delivery output based upon the percent deviation of cylinder cutout engine horsepower output per cylinder and the overall engine horsepower percent deviation.

2. The method of claim 1, wherein comparing the overall engine operating horsepower to the target engine operating horsepower comprises the steps of:

(a) determining whether the overall engine operating horsepower is greater than about 7% of the target engine horsepower; and (b) determining whether the overall engine operating horsepower is in a range of about −7% to about +7% of target engine operating horsepower.

3. The method of claim 1, wherein when the overall engine operating horsepower is determined to be greater than about 7% of the target engine operating horsepower, the engine is determined to be defective.

4. The method of claim 1, wherein, the overall engine operating horsepower is determined to be in the range of about −7% to about +7% of the target engine operating horsepower.

5. The method of claim 1, wherein the fuel injector delivery output is adjusted by the steps of:

(a) determining the percent deviation per engine cylinder and overall engine horsepower percent deviation according to the formula:

$$CCF = \frac{\left(\frac{6}{5}\overline{HP}_{cutout} - HP_{cx} - HP_{Target}\right)}{HP_{Target}} \cdot 100$$

where:
   $\overline{HP}_{cutout}$=Mean of cylinder cutout horsepower
   $HP_{cx}$=Cylinder x cutout horsepower
   CCF=Cylinder correction factor
   $HP_{Target}$=Target of cylinder cutout horsepower (b) entering the fuel injector delivery output calibrations into the ECM memory.

6. The method of claim 1, further including the step of shutting the engine down prior to adjusting the fuel injector delivery output.

7. A method for adjusting the horsepower output of an internal combustion engine having an electronic control with programmable memory, a plurality of cylinders, and at least one fuel injector in fuel delivery communication with each cylinder, said method comprising the steps of:

(a) operating the engine at full load until the engine reaches an equilibrium operating temperature and achieves an overall engine operating horsepower;

(b) sensing and recording the overall engine operating horsepower;

(c) comparing the overall engine operating horsepower to a target engine operating horsepower;

(d) recording the target engine operating horsepower and current fuel injector output delivery calibration codes;

(e) disabling each cylinder individually sequentially, and recording the change in overall engine horsepower output per each disabled cylinder;

(f) determining new calibration codes for the fuel injector delivery output based upon the percent deviation of cylinder cutout horsepower output per cylinder and the overall engine horsepower percent deviation;

(g) shutting the engine down to enter the new fuel injector delivery output calibrations into the memory.

8. The method of claim 7, wherein sensing the overall engine operating horsepower comprises the steps of:
   (a) sensing whether the overall engine operating horsepower is greater than about 7% of the target engine horsepower; and
   (b) sensing whether the overall engine operating horsepower is in a range of about −7% to about +7% of target engine operating horsepower.

9. The method of claim 7, wherein when the overall engine operating horsepower is sensed to be greater than about 7% of the target engine operating horsepower, the engine is determined to be defective.

10. The method of claim 7, wherein, the overall engine operating horsepower is determined to be in the range of about −7% to about +7% of the target engine operating horsepower.

11. The method of claim 7, wherein the fuel injector delivery output is adjusted by the steps of:
   (a) determining the percent deviation per engine cylinder and overall engine horsepower percent deviation according to the formula:

$$CCF = \frac{\left(\frac{6}{5}\overline{HP}_{cutout} - HP_{cx} - HP_{Target}\right)}{HP_{Target}} \cdot 100$$

where:
   $\overline{HP}_{cutout}$=Mean of cylinder cutout horsepower
   $HP_{cx}$=Cylinder x cutout horsepower
   CCF=Cylinder correction factor
   $HP_{Target}$=Target of cylinder cutout horsepower
   (b) entering the fuel injector delivery output calibrations into the ECM memory.

12. A system for adjusting the horsepower output of an internal combustion engine having an electronic control module (ECM) with programmable memory, at least one cylinder, and at least one fuel injector in fuel delivery communication with said cylinder, comprised of:
   (a) engine operating means to operate the engine at full load until the engine reaches an equilibrium operating temperature and achieves an overall engine operating horsepower;
   (b) horsepower sensing means to determine the overall engine operating horsepower;
   (c) horsepower comparing means to determine the overall engine operating horsepower to a target engine operating horsepower;
   (d) responsive fuel delivery means to cut off fuel dispensed by the fuel injectors to each cylinder individually sequentially, and recording the change in overall engine horsepower output per each disabled cylinder; and
   (e) fuel adjusting means to adjust the fuel injector delivery output based upon the percent deviation of cylinder cutout engine horsepower output per cylinder and the overall engine horsepower percent deviation.

13. The system of claim 12, wherein the comparing means further includes
   (a) horsepower determining means to determine whether the overall engine operating horsepower is greater than about 7% of the target engine horsepower; and
   (b) horsepower determining means to determine whether the overall engine operating horsepower is in a range of about −7% to about +7% of target engine operating horsepower.

14. The system of claim 12, wherein when the overall engine operating horsepower is determined to be greater than about 7% of the target engine operating horsepower, the engine is determined to be defective.

15. The system of claim 12, wherein, the overall engine operating horsepower is determined to be in the range of about −7% to about +7% of the target engine operating horsepower.

16. The system of claim 12, wherein the fuel injector delivery output is adjusted by the steps of:
   (a) determining the percent deviation per engine cylinder and overall engine horsepower percent deviation according to the formula:

$$CCF = \frac{\left(\frac{6}{5}\overline{HP}_{cutout} - HP_{cx} - HP_{Target}\right)}{HP_{Target}} \cdot 100$$

where:
   $\overline{HP}_{cutout}$=Mean of cylinder cutout horsepower
   $HP_{cx}$=Cylinder x cutout horsepower
   CCF=Cylinder correction factor
   $HP_{Target}$=Target of cylinder cutout horsepower
   (b) entering the fuel injector delivery output calibrations into the ECM memory.

17. The system of claim 12, further including means to shut the engine down prior to adjusting the fuel injector delivery output.

18. A system for adjusting the horsepower output of an internal combustion engine having an electronic control module (ECM) with programmable memory, a plurality of cylinders, and at least one fuel injector in fuel delivery communication with each cylinder, said system comprising:
   (a) engine operating means to operate the engine at full load until the engine reaches an equilibrium operating temperature and achieves an overall engine operating horsepower;
   (b) horsepower sensing means to determine the overall engine operating horsepower;
   (c) horsepower comparing means to determine the overall engine operating horsepower to a target engine operating horsepower;
   (d) recording means to record the target engine operating horsepower and current fuel injector output delivery calibration codes;
   (e) cylinder disabling means to disable each cylinder individually sequentially, and record the change in overall engine horsepower output per each disabled cylinder;
   (f) determining means to determine new calibration codes for the fuel injector delivery output based upon the percent deviation of cylinder cutout horsepower output per cylinder and the overall engine horsepower percent deviation;
   (g) engine disabling means to shut the engine down to enter the new fuel injector delivery output calibrations into the memory.

19. The system of claim 18, wherein sensing the horsepower sensing means is comprised of:
   (a) sensing means to determine whether the overall engine operating horsepower is greater than about 7% of the target engine horsepower; and
   (b) sensing means to determine whether the overall engine operating horsepower is in a range of about −7% to about +7% of target engine operating horsepower.

20. The system of claim 18, wherein when the overall engine operating horsepower is sensed to be greater than about 7% of the target engine operating horsepower, the engine is determined to be defective.

21. The system of claim 18, wherein, the overall engine operating horsepower is determined to be in the range of about −7% to about +7% of the target engine operating horsepower.

22. The system of claim 18, wherein the fuel injector delivery output is adjusted by the steps of:

(a) determining the percent deviation per engine cylinder and overall engine horsepower percent deviation according to the formula:

$$CCF = \frac{\left(\frac{6}{5}\overline{HP}_{cutout} - HP_{cx} - HP_{Target}\right)}{HP_{Target}} \cdot 100$$

where:

$\overline{HP}_{cutout}$=Mean of cylinder cutout horsepower $HP_{cx}$=Cylinder x cutout horsepower CCF=Cylinder correction factor $HP_{Target}$=Target of cylinder cutout horsepower (b) entering the fuel injector delivery output calibrations into the ECM memory.

* * * * *